W. C. McCOOL.
Plows.
No. 144,552.      Patented Nov. 11, 1873.
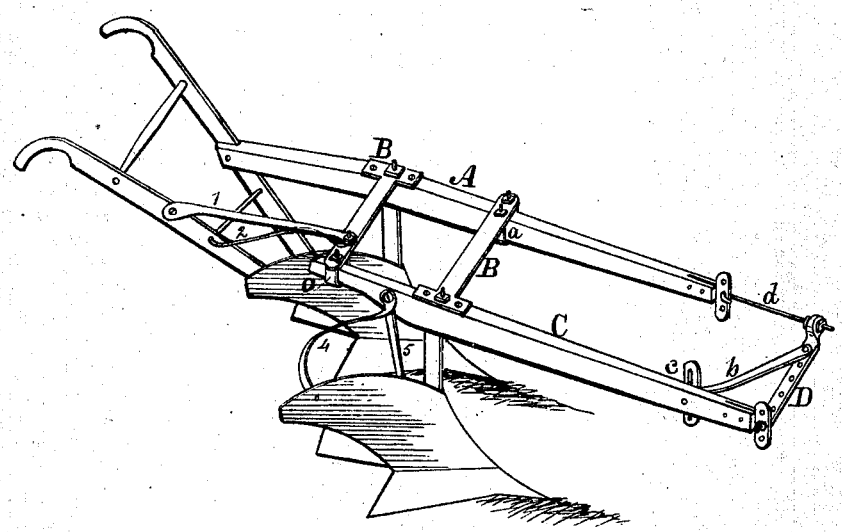
Witnesses.
Jacob J. Kiser
Perry Perkins
Wells C. McCool
Inventor.
Thomas G. Orwig, Attorney.

UNITED STATES PATENT OFFICE.

WELLS C. McCOOL, OF GUTHRIE CENTRE, IOWA, ASSIGNOR OF ONE-HALF HIS RIGHT TO DANIEL H. BRUMBAUGH.

IMPROVEMENT IN PLOWS.

Specification forming part of Letters Patent No. 144,552, dated November 11, 1873; application filed August 15, 1873.

*To all whom it may concern:*

Be it known that I, WELLS C. McCOOL, of Guthrie Centre, in the county of Guthrie and State of Iowa, have invented an Improved Gang-Plow, of which the following is a specification:

The object of my invention is to save the labor of one person and one horse in operating two stirring-plows. It consists in the manner of coupling two common plows (right or left) together, so that they can be adjusted and operated by one person, as hereinafter fully set forth.

My drawing is a miniature perspective view, illustrating the construction and operation of my invention.

A is a common beam of a common plow. B is a T-shaped yoke bolted on top of the beam, to stand at a right angle toward the right.

The T-end is specially formed and adapted to allow the top of the plow-standard to pass through and to combine the standard, beam, and yoke rigidly together by drawing the nut on the top and screw end of the standard. This yoke may be braced to the beam and plow-standard in any suitable way.

Two holes are provided in the end of the yoke to receive the screw ends of a common loop, *a*. C is the beam of a second plow with its handles removed, and the rear end of the beam fitted into the loop *a*. A duplicate of the yoke B is bolted on top of the beam C, and extends at a right angle to the beam A, the front end of which is encircled by the loop *a*. By drawing the nuts on the screw ends of the loops *a a*, the beams A C will be clamped in the loops, and thereby rigidly locked together with the yokes B B. By loosening the nuts the beam C, and also the plow carried thereby, may be moved back and forth, and adjusted to regulate its advance position relative to the other plow. D is an adjustable equalizer used to combine the front ends of the beams A and C, and to connect and govern the draft of the horses. It is in the form of a bar with a series of vertical holes in its body, and an eye on its left end, and a pin or bolt on its right end. *b* is a branch extending from the left end toward the rear and right, and terminates in the form of an elongated vertical plate, *c*, in which is a vertical slot. The pin on the right end passes through the clevis on the right beam C, and a bolt or set-screw passes through the slot in the plate *c*, and clamps the plate against the inside of the beam. A series of holes in the plow-clevis allow the pin or bar D to be adjusted, and the slot in the plate *c* accommodates such vertical adjustment of the equalizer. *d* is a rod, with a hooked or forked end linked to the clevis on the beam A, and passed forward through the eye on the left end of the bar or equalizer D. A nut on the front end of this rod *d*, and the use of washers, furnishes a means of lengthening and shortening the rod to accommodate itself to the backward and forward adjustment of the advance or right-hand plow.

By means of the series of holes in the bar or equalizer D, the draft can be readily equalized between the two plows, and the width of furrows thereby regulated; and, by means of the plate *c*, linked rod *d*, and pin on the bar D, the equalizer can be readily raised and lowered to govern the depth of the furrows.

1 2 3 4 5 are braces, which may vary in number, and may be formed and attached in any suitable manner to support the coupled plows.

Two ordinary stirring-plows may be thus readily and cheaply formed into a gang-plow that can be operated by one person and three horses, and do as much and as good plowing as two persons and four horses could accomplish in the same given time with two independent plows.

I claim as my invention—

1. The T-shaped yokes B B carrying the loops *a a*, when combined with the beams and standards of two plows, in the manner and for the purposes specified.

2. The equalizer D, having a branch, *b*, carrying the plate *c*, and rod *d* formed and combined with the front ends of two plow-beams, in the manner and for the purpose specified.

WELLS C. McCOOL.

Witnesses:
JAMES A. LYONS,
WILLIAM W. LYONS.